US008156982B2

(12) United States Patent
Weber

(10) Patent No.: US 8,156,982 B2

(45) Date of Patent: Apr. 17, 2012

(54) FILM TRANSFER UNIT WITH INTEGRATED FURTHER PROCESSING DEVICE

(75) Inventor: Alexander Weber, Weinheim (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 1295 days.

(21) Appl. No.: 11/732,076

(22) Filed: Apr. 2, 2007

(65) Prior Publication Data

US 2007/0227651 A1 Oct. 4, 2007

(30) Foreign Application Priority Data

Mar. 31, 2006 (DE) ......................... 10 2006 015 466

(51) Int. Cl.

*B29C 53/82* (2006.01)
*B32B 38/14* (2006.01)
*B65C 9/40* (2006.01)
*B65C 9/42* (2006.01)

(52) U.S. Cl. ......... 156/361; 156/350; 156/429; 156/446

(58) Field of Classification Search .......... 156/350–364, 156/366, 378, 429, 446, 582

See application file for complete search history.

(56) References Cited

U.S. PATENT DOCUMENTS

| | | | | |
|---|---|---|---|---|
| 4,334,946 | A * | 6/1982 | Kanoto | 156/352 |
| 4,539,063 | A * | 9/1985 | Cue et al. | 156/361 |
| 5,279,697 | A * | 1/1994 | Peterson et al. | 156/358 |
| 5,507,908 | A * | 4/1996 | Fukushima et al. | 156/363 |
| 5,565,054 | A | 10/1996 | Lappe et al. | |
| 6,378,750 | B1 | 4/2002 | Disano et al. | |
| RE37,758 | E * | 6/2002 | Bradshaw et al. | 156/539 |
| RE38,553 | E * | 7/2004 | Maynard et al. | 156/521 |
| 7,753,097 | B2 * | 7/2010 | Dangami et al. | 156/378 |

FOREIGN PATENT DOCUMENTS

| | | | |
|---|---|---|---|
| DE | 102005011568 | A1 | 11/2005 |
| DE | 10 2005 005 490 | A1 | 8/2006 |
| DE | 102005005490 | A1 * | 8/2006 |
| EP | 0 578 706 | B1 | 11/1994 |
| EP | 0987106 | A1 | 3/2000 |

(Continued)

OTHER PUBLICATIONS

English translation of JP2006224667A, Ladda et al. Aug. 2006.*

(Continued)

*Primary Examiner* — Sonya Mazumdar

(74) *Attorney, Agent, or Firm* — Laurence A. Greenberg; Werner H. Stemer; Ralph E. Locher

(57) ABSTRACT

If a plurality of part film webs are each stored on different supply shafts, considerable effort is necessary to use a plurality of part film webs within one apparatus. If the part film webs are stored as a plurality of part film webs on a common supply shaft, various problems can arise. Preferably a plurality of part film webs can be used in an apparatus for the transfer of a transfer layer to a sheet. Ideally, the supply shaft and/or collecting shaft is/are constructed as a friction shaft, so that the transfer of the rotational movement of the friction shaft to the transfer film supply roll and/or transfer film collecting roll is carried out via a frictional connection between shaft and roll, which can be overcome by tensile forces of the transfer film web. Therefore, a plurality of transfer film rolls having different diameters are provided on the friction shaft.

27 Claims, 3 Drawing Sheets

FOREIGN PATENT DOCUMENTS

| | | | | |
|---|---|---|---|---|
| EP | 1505020 | A2 | | 2/2005 |
| EP | 1688252 | A2 | | 8/2006 |
| GB | 2 254 586 | A | | 10/1992 |
| GB | 2254586 | A | | 10/1992 |
| JP | 7315651 | A | | 12/1995 |
| JP | 11334294 | A | | 12/1999 |
| JP | 2005197331 | A | | 7/2005 |
| JP | 2006224667 | A | * | 8/2006 |
| WO | WO 9212859 | A1 | * | 8/1992 |

OTHER PUBLICATIONS

Englsih translation of JP-07-315651; Utsuki et al. Dec. 5, 1995.*
Englsih translation of JP2005-197331; Maenami et al. Jul. 21, 2005.*
European Office Action dated Nov. 23, 2010.

* cited by examiner

FILM TRANSFER UNIT WITH INTEGRATED FURTHER PROCESSING DEVICE

CROSS-REFERENCE TO RELATED APPLICATION

This application claims the priority, under 35 U.S.C. §119, of German application DE 10 2006 015 466.5, filed Mar. 31, 2006; the prior application is herewith incorporated by reference in its entirety.

BACKGROUND OF THE INVENTION

Field of the Invention

The present invention relates to an apparatus for transferring a transfer layer from a carrier film, which together form a transfer film, to a printing material. The apparatus contains at least one film module having a supply shaft for holding at least one transfer film supply roll for storing and unwinding at least one transfer film web. In this case, the apparatus is intended to have a transfer film guiding device at least for guiding the transfer film web from the supply shaft to a transfer nip along a film transport path, the transfer nip being formed by an impression cylinder and a film transfer cylinder for transferring the transfer layer to the printing material. For this purpose, the printing material is guided through the transfer nip along a printing material transport path.

Furthermore, the apparatus contains a collecting device for accommodating the at least one transfer film web guided through the transfer nip.

Furthermore, the invention relates to a method for transferring a transfer layer from a carrier film, which together form a transfer film, to a printing material, in which the transfer film is provided as at least one transfer film web on at least one transfer film supply roll on a supply shaft. The at least one transfer film web is guided along a film transport path to a transfer nip. The transfer layer is transferred from the transfer film to a printing material within the transfer nip, and the transfer film web is then guided to a collecting device.

The invention preferably relates to an apparatus which is suitable for what is known as cold film embossing.

During cold film embossing, a transfer layer is transferred from a carrier material to a printing material.

The carrier material used is a carrier film. Applied to the carrier film is a varnish layer, which is in particular responsible for the coloring of the transfer layer. Connected to the varnish layer is an aluminum layer, which effects the metallic gloss of the transfer layer.

Furthermore, a further adhesive layer can also be applied to the aluminum layer, which increases the adhesive properties of the transfer layer with the adhesive to the printing material. The layers which are transferred from the carrier material are designated as the transfer layer.

In order to transfer the transfer layer to the printing material, the transfer film is guided through a transfer nip together with the printing material. The transfer nip is formed by a transfer cylinder and an impression cylinder, which rest against each other. The transfer cylinder and the impression cylinder are set against each other, while rotating, with a force such that the transfer layer is transferred to the printing material in the transfer nip.

In order that the transfer layer can be transferred to the printing material region by region, before the film transfer the printing material is provided with an adhesive layer which corresponds to the region in which film is to be transferred.

The adhesive used can be a colorless adhesive, an adhesive with a specific inherent color or else an adhesive dyed so as to correspond to the film. It is already known, from bronzing technology, to use a particularly adhesive ink, whose color corresponds to the desired metallization, in order to transfer metal particles. To this extent, it is of course also possible for an adhesive ink to be used as an alternative to a dyed adhesive.

The transfer layer can be substantially a metal layer or else other layers. For instance, an aluminum layer can be provided which, depending on the requirement, is applied to a yellow/golden varnish layer or a silver varnish layer.

Furthermore, the transfer layer used can also be a colorless layer, for example of PE film, which is transferred to the printing material in such a way that it forms a protective layer there.

The use of a conductive layer as the transfer layer is also possible; in this way, electrically and/or thermally conductive regions can be transferred to the printing material. In addition, the transfer of prepared delimited layer regions as the transfer layer is possible; in this case, these can be RFID chips or their antennas, for example. Suitable ceramics can also be transferred. In this way, it is conceivable that even superconducting structures can be transferred to a printing material.

An apparatus for cold film embossing is presented in European patent EP 0 578 706 B1, corresponding to U.S. Pat. Nos. 5,565,054 and 5,735,994.

In this case, the cold film embossing is carried out within a multicolor printing press. The printing material is transported along a predefined transport path in the printing press. The printing material can be, for example, paper sheets, pasteboards or else rolls.

In a first printing unit of the printing press, an adhesive is transferred to the printing material instead of an ink. In order to apply the adhesive region by region, an appropriately imaged printing plate is clamped on in this printing unit and the adhesive is transferred to the printing material like a conventional offset printing ink. Such a printing unit applying adhesive is also designated an application unit.

The printing material is then transported onward into a second printing unit. In the second printing unit, the impression cylinder and the blanket cylinder are constructed as a transfer unit.

In the region of the second printing unit, there is a film module having a transfer film supply shaft and a transfer film collecting shaft. Over intermediate rolls of a film guiding device, the film is guided as a transfer film web from the transfer film supply shaft to the transfer nip and onward to the transfer film collecting shaft.

In order to transfer the transfer layer to the printing material, the transfer film web and the printing material having the regional adhesive layer are guided jointly through the transfer nip in such a way that the transfer layer rests on the adhesive layer. The transfer layer is then transferred to the printing material by pressure in the transfer nip. By the adhesive, the transfer layer is removed cleanly from the transfer film.

For clean transfer of the transfer layer to the printing material, the film and the printing material are driven at the same speed in the region of the transfer nip during the transfer.

In a following press unit, action is then taken substantially on the transferred transfer layer, so that permanent adhesion of the film application is achieved.

European patent EP 0 578 706 B1 also describes how a plurality of narrow part film webs can also be used. These can then be supplied to different transfer regions of a printing material in a transfer nip.

If the individual part film webs are each stored on different supply shafts as transfer film rolls, then considerable effort is needed to use a plurality of part film webs within one apparatus.

If the part film webs are stored as a plurality of part film rolls on a common supply shaft, then various problems can arise. First, no different speeds of the part film webs are possible; second it is a problem in particular when part film rolls of different diameters are used. Since the supply shaft rotates at a specific speed, the web speeds, that is to say the different circumferential speeds of the rolls, result on account of the different radii of the rolls. To compensate for this such that the speed of the film web and of the printing material is the same again in the transfer nip is very complicated. In addition, a reduced or increased web tension of the transfer film webs can result, depending on the current radius and rotational speed of the supply shaft.

SUMMARY OF THE INVENTION

It is accordingly an object of the invention to provide a film transfer unit with an integrated further processing device which overcome the above-mentioned disadvantages of the prior art devices and methods of this general type, in which and in a simple way, a plurality of part film webs can be used in an apparatus for the transfer of a transfer layer to a sheet.

With the foregoing and other objects in view there is provided, in accordance with the invention, an apparatus for transferring a transfer layer from a carrier film, which together form a transfer film, to a printing material. The apparatus has at least one film module with at least one transfer film supply roll for storing and unwinding at least one transfer film web and a supply shaft for holding the at least one transfer film supply roll. A transfer film guiding device is provided for guiding the transfer film web from the supply shaft to a transfer nip along a film transport path. The transfer nip is formed by an impression cylinder and a film transfer cylinder for transferring the transfer layer to the printing material, by guiding the printing material through the transfer nip along a printing material transport path. A collecting device is provided for accommodating the at least one transfer film web guided through the transfer nip. The collecting device has at least one transfer film collecting roll for winding up the at least one transfer film web and a collecting shaft for holding the at least one transfer film collecting roll. The supply shaft and/or the collecting shaft is a friction shaft, so that a transfer of a rotational movement of the friction shaft to the at least one transfer film supply roll and/or the at least one transfer film collecting roll is carried out via a frictional connection between the friction shaft and the roll which can be overcome by tensile forces of the transfer film web.

Provision is made for the collecting device used to be a collecting shaft to hold at least one transfer film collecting roll for winding up the at least one transfer film web.

The supply shaft and/or the collecting shaft are in this case to be constructed, according to the invention, as a friction shaft or friction shafts, so that the transfer of the rotational movement of the friction shaft to the at least one transfer film supply roll and/or the transfer film collecting roll is carried out via a frictional connection between the shaft and roll, which can be overcome by tensile forces of the transfer film web.

In the following text and also in the preceding text, instead of a transfer film supply roll or transfer film collecting roll, mention is also made simply generally of a film roll or a transfer film roll or simply a roll.

The frictional connection between the shaft and roll can be made in various ways. A roll contains the transfer film web which is wound on a roll core. This core is pushed onto the shaft. In one possible embodiment there is a frictional connection between the inside of the core and the surface of the friction shaft. In this case, the frictional force on which the connection is based can be constant or else controllable. If a tensile force is exerted on the core, for example via a pull on the film web, then slippage occurs between the core and the surface of the friction shaft; in this way the rotation of the core with respect to the shaft is reduced or accelerated.

A second possibility for the frictional connection between shaft and roll is for the core first to be firmly connected to an outer ring of the shaft. The outer ring is then itself connected to an inner ring of the shaft by a frictional connection, and in this way can produce a frictional connection between shaft and roll. Slippage between the roll and shaft can then be achieved in a way analogous to that described.

Frictional connections are to be understood to be both direct and indirect frictional connections between the roll and core, that is to say including connections via intermediate elements.

Then, according to the method, provision is made for at least one of the transfer film supply roll and the transfer film collecting roll to be provided on the transfer film supply roll and/or the transfer film collecting roll.

If the diameter of the transfer film roll changes, then the circumferential speed of the transfer film web on the roll changes if the rotational speed of the shaft is maintained. If the diameter decreases, the circumferential speed decreases. By a pull on the film web, the circumferential speed can then be increased again by slippage occurring between the shaft and roll. This can occur in particular in the region of the transfer film supply shaft.

In the region of the collecting shaft, the diameter of the roll and therefore the circumferential speed can likewise increase. Here, by the tensile force on the film web, the circumferential speed can be reduced if the frictional force between roll and shaft is overcome by the tensile force.

By use of the apparatus described, it is possible for a plurality of transfer film rolls to be provided in a simple way on one shaft, be it a supply shaft and/or collecting shaft. These rolls can have different diameters. As a result of the slippage which results between roll and shaft when the frictional force is overcome, the same circumferential speeds can be achieved for the rolls on the shaft, irrespective of their respective diameter.

In order to exert the necessary tensile force on the transfer film web in order to overcome the frictional force and therefore to achieve an acceleration, that is to say an increase or decrease in the circumferential speed, of the respective transfer film web on the roll, at least one forward pulling device for pulling the at least one transfer film web in the direction of the transfer nip is advantageously provided. A roll on the collecting shaft can therefore be braked deliberately; a roll on the supply shaft can be accelerated deliberately. The forward pulling device can exert a pulling force on the transfer film, for example via belts. In particular, a belt can be provided on the carrier film side of the transfer film for this purpose. The belt can produce a contact with the film by a suction force.

According to the invention, provision is beneficially made for the forward pulling device to be a pair of forward pulling rolls which exerts a tensile force on the at least one transfer film web via friction, so that a pull in the direction of the transfer nip is exerted on the at least one transfer film roll. Such a pair of forward pulling rolls is constructed relatively simply and permits reliable control via the forward pulling force. In particular, a drive for the rolls is also possible, which is possible with the drive of the pair of rolls which forms the transfer nip. This can be, in particular, the same drive.

In alternative or mutually supplementary embodiments which are in each case advantageous on their own, provision is made for the forward pulling device either to be disposed after the transfer nip and to exert a tensile force in the direction of the transfer nip on the at least one transfer film supply roll on the supply shaft, and/or for the forward pulling device to be disposed before the transfer nip and to exert a tensile force in the direction of the transfer nip on the at least one transfer film collecting roll on the collecting shaft, and/or, alternatively or in addition, provision can also be made for the forward pulling device to include the impression cylinder and the film transfer cylinder which form the transfer nip.

Thus, in each case pulling the film web forward reliably in the direction of the transfer nip is possible. In particular, for the cases in which the rolls forming the transfer nip are not involved in the forward pull, that is to say the time during which a cylinder gap of one of the two rolls is in the region of the transfer nip, a forward pull by a forward pulling device is always still possible.

In a particularly advantageous development of the invention, provision is made for at least two transfer film rolls, which in each case are able to store and unwind a transfer film web, to be provided on the supply shaft or both on the supply shaft and on the collecting shaft. As a result of providing a plurality of transfer film webs on a plurality of transfer film rolls on the supply shaft and/or the collecting shaft, in conjunction with the provision according to the invention of a friction shaft as the supply shaft and/or the collecting shaft, a flexible multiple web ability of the apparatus can be achieved.

In particular, provision can further be made for a plurality of transfer film rolls to be provided only on the supply shaft and for this shaft to have a friction shaft. The collecting shaft itself must be provided as a driven shaft in order to permit the transfer film webs to be wound up. In principle, the supply shaft can run concomitantly and passively without its own drive or, according to the invention, can likewise be provided as a drive shaft. In the case of a passive embodiment of the supply shaft, this can preferably be braked. In a further embodiment, both the supply shaft and the collecting shaft can be implemented as friction shafts and in each case hold a plurality of transfer film rolls.

The slippage can be made possible only on the supply roll or also on the collecting roll, depending on which shafts are implemented as friction shafts.

In a further advantageous refinement of the apparatus according to the invention, at least one determining device for determining the roll diameter of the at least two transfer film rolls is provided. Via this, accurate monitoring of the diameters or radii of the individual transfer film rolls on the respective shaft can be made possible.

It is then possible and provided in accordance with the method for the diameters D of the individual transfer film supply rolls on the supply shaft to be determined, for the average feed speed $V_{vm}$ of the transfer film through the transfer nip to be determined, and for the supply shaft to be driven with an angular velocity w such that the nominal circumferential speed $V_{UnV}$=w*D/2 of the transfer film supply roll with the greatest diameter is less than the average feed speed $V_{vm}$ of the transfer film through the transfer nip.

As a result of ensuring a respectively lower speed of the driven transfer film roll on the supply shaft than the speed necessary for the passage through the transfer nip, in particular in interaction with pulling devices that are provided, a web tension of the transfer film web can always be achieved.

In order to achieve a preferred web tension, provision is beneficially made in a further development for the supply shaft to be driven in such a way that the nominal circumferential speed $V_{UnV}$ of the transfer film supply roll is less than 100% but equal to or more than 95% of the average feed speed $V_{vm}$.

In an alternative or additional embodiment, which is provided in particular when the collecting shaft is implemented as a friction shaft and is driven, provision is made for the diameters D of the individual transfer film collecting rolls on the collecting shaft to be determined, for the average feed speed $V_{vm}$ of the transfer film through the transfer nip to be determined and for the collecting shaft to be driven with an angular velocity w such that the nominal circumferential speed $V_{UnS}$=w*D/2 of the transfer film collecting roll with the greatest diameter is higher than the average feed speed $V_{vm}$ of the transfer film through the transfer nip.

Provision is particularly preferably made in this case for the collecting shaft to be driven in such a way that the nominal circumferential speed $V_{UnS}$ of the transfer film collecting roll is more than 100% but less than or equal to 105% of the average feed speed $V_{vm}$.

The advantages of this embodiment are analogous to those in the case of the supply shaft. In addition, these two embodiments can supplement each other.

As at least one determining device for determining the roll diameters, provision is made for each transfer film roll to be assigned a non-contacting sensor, which is able to detect the distance of the surface of the transfer film roll from the sensor or directly to detect the radius of the transfer film roll.

In this way, influencing the transfer film can be minimized.

In particular, provision can be made for the non-contacting sensor to be an ultrasonic sensor or an optical sensor which detects light reflected from the surface.

Alternatively, as a determining device each transfer film roll can be assigned a contacting sensor. In this case, a determination of the roll diameters which is particularly less susceptible to faults can advantageously be made possible. Alternatively, via this measure a direct determination of the circumferential speed of the transfer film web on the transfer film roll is also possible.

In a further development, provision is made for the contacting sensor to be a running wheel, which determines a change in the diameter of the transfer film supply roll from a measured unwind travel.

Provision can alternatively also be made for the contacting sensor to be a resistance sensor which determines the quantity of transfer film which is present on the transfer film roll via a measured resistance. For this purpose, provision can in particular also be made for the film itself to have at least one conducting region. This can either be a continuous conductor or respectively conducting regions which, when the film is wound up, lie on one another and in this way exhibit a resistance as a function of the layer thickness. Alternatively, instead of the resistance sensor, a capacitive sensor can also be used.

According to the method, provision is further made for the transfer film web to be pulled off the supply shaft and/or collecting shaft in such a way that its actual feed speed $V_v$ in the region of the transfer nip corresponds at least for some time to the sheet speed $V_B$. For this purpose, an appropriate control device for driving the forward pulling device as a function of the sheet speed is provided. At least when a transfer of the transfer layer in the transfer nip is envisaged, an equally high speed of printing material and transfer film can then be provided. Only then is a precise and clean transfer of the transfer layer to the printing material possible.

In a particularly advantageous further development, provision is made, according to the method, for the transfer film web to be cycled in such a way that its actual feed speed $V_v$ at times in which no film transfer to the printing material is carried out deviates from the printing material speed and, before an envisaged film transfer, is accelerated in such a way that the actual feed speed again corresponds to the printing material speed $V_B$. In this way, transfer film can be saved when no transfer of transfer layer to the printing material is envisaged. This is the case, for example, when no printing material is currently being guided through the transfer nip or if no transfer layer is intended to be transferred to specific regions of the printing material.

In order to make this cycling possible, according to the apparatus a film cycling device is provided in the region of the transfer nip.

In a preferred embodiment, provision is made for the film cycling device to contain at least two guide rollers coupled to each other for guiding the transfer film web, which are provided on opposite sides of the transfer nip, these coupled guide rollers can be moved simultaneously in a first direction via a drive device, so that the speed of the transfer film through the transfer nip is reduced, and can be moved simultaneously in a second direction, so that the speed of the transfer film in the transfer nip corresponds to the transport speed of the printing material. If mention is made of a simultaneous movement, this results in a movement coupled in such a way that the guide rollers are moved together. In this case, the one first guide roller of the film cycling device is wrapped around by the transfer film to be supplied to the transfer nip; the second guide roller is wrapped around by the transfer film which is transported away from the transfer nip toward the collecting device.

Depending on the direction of movement of the rollers, the travel, that is to say the film length between the first guide roller and transfer nip, is reduced and at the same time the travel between second guide roller and transfer nip is enlarged or vice versa. In this way, by a simultaneous movement, in particular via a coupled movement, an acceleration of the film in the transfer nip or braking of the film can be achieved simply.

By use of at least one transfer film buffer according to the invention in the region between the supply shaft and the transfer nip and/or between the transfer nip and the collecting device, even better cycling of the transfer film can be made possible. The unwinding of the transfer film web from the supply shaft, the winding up onto the collecting shaft is in this case carried out at an average web speed. This web speed depends on the speed of the printing material and on the quantity of transfer layer needed for the entire print job, that is to say more accurately on the length of the requisite transfer layer. The transfer film is always unwound at the same speed and stored in the transfer film buffer. Depending on whether transfer of the transfer layer to the sheet is envisaged, film is then removed from the store at the speed of the printing material and led through the transfer nip. This speed in the transfer nip is typically higher than the average web speed. The used web can then be supplied directly to the collecting device and possibly destroyed or, by a further transfer film buffer, the web can be stored temporarily in such a way that it is supplied to the collecting shaft at the average web speed.

If, as described, an apparatus for holding and/or destroying the transfer film is provided instead of the collecting shaft, then, in a further development, provision is made for the collecting device to contain at least one container and feed elements for feeding the transfer film web to the container. Alternatively or comprised by this container, provision can also be made for the collecting device to contain at least one shredder for destroying the transfer film web by shredding. In this way, the space required for the collecting device can be reduced and a possible additional working step can be saved.

Other features which are considered as characteristic for the invention are set forth in the appended claims.

Although the invention is illustrated and described herein as embodied in a film transfer unit with an integrated further processing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
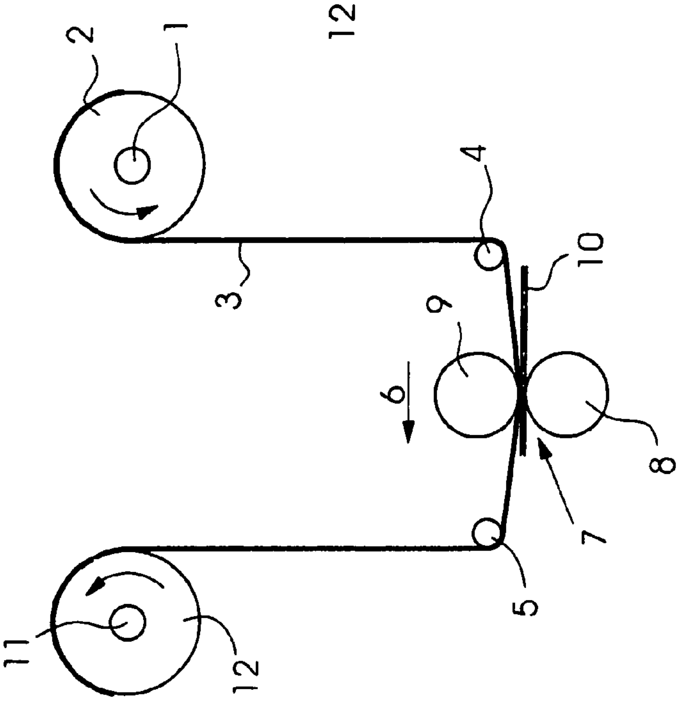
FIG. 1 PRIOR ART
FIG. 1 is a diagrammatic, side view of an apparatus for cold film transfer according to the prior art.

Referring now to the figures of the drawing in detail and first, particularly, to FIG. 1 thereof, there is shown an apparatus for transferring a transfer layer from a carrier film, which together form a transfer film, to a printing material 10 according to the prior art.

A transfer film web 3 is rolled up on a transfer film supply roll 2. The transfer film supply roll 2 is provided on a supply shaft 1, which rotates in a direction illustrated by an arrow. A drive, not illustrated here, can be provided to rotate the supply shaft 1.

The roll 2 is firmly connected to the supply shaft 1, so that the rotation of the shaft 1 is transferred directly to the roll 2. In this way, the transfer film web 3 is unrolled from the supply shaft 1 and transported over a deflection roll 4 to a transfer nip 7. It is also possible for a plurality of deflection rolls 4 to be provided in order to permit an appropriate course of the transport path of the transfer film web 3.

The transfer film web 3 is then guided through the transfer nip 7 in direction 6. The transfer nip 7 is formed by an impression cylinder 8 and a transfer cylinder 9, which are set against each other. A printing material 10 which, for example, can be a sheet of paper, is likewise guided through the transfer nip 7 in the direction 6 together with the transfer film web 3. In this case, it is necessary to take care that the transfer film web 3 and the printing material 10 have the same feed speed, at least in the transfer nip 7. A corresponding drive of the supply shaft 1 must take this into account.

An adhesive layer has been applied to the printing material 10 in accordance with an image in a non-illustrated application unit. If the film transfer is to take place within the printing press, then the application of adhesive may have been carried out in a first printing unit mounted before the transfer nip. The adhesive is then transferred to the printing material 10 like conventional ink via a printing plate and a blanket cylinder. The application of adhesive to the printing material 10 in accordance with an image depends directly on the imaging of the printing plate, as is the case in conventional ink application. In the case of an in-line film transfer within a printing press, the transfer nip 7 can additionally be formed by a blanket cylinder and an impression cylinder set against the latter. This is then a second printing unit of the printing press, following the application unit. In another variant, however, it is likewise possible for the blanket cylinder of the application unit and the transfer cylinder 9 to be set against the same impression cylinder 8 and for the transfer nip 7 to be positioned after the press nip for the application of adhesive; in this way, the application of adhesive and the film transfer can be carried out in a common compact unit of the printing press. For the purpose of improved clarity, these more complex embodiments are not illustrated here.

The printing material 10 to which the adhesive layer has been applied is guided through the transfer nip 7 together with the transfer film web 3. By the adhesive and under the action of pressure, the transfer layer of the transfer film web 3 is then removed from the transfer film web 3 in the regions imaged with adhesive and transferred to the printing material 10. The used transfer film web 3 is guided away from the transfer nip 7 over further deflection rolls 5 and fed to a collecting shaft 11. Here, the transfer film web 3 is rolled up on a transfer film collecting roll 12; for this purpose, the latter is rotated in a direction illustrated by an arrow.

In the case illustrated here, a plurality of transfer film webs 3 can be stored on a common supply shaft 1 only when, in each case by the rotational speed of the supply shaft 1, the same web speed of the transfer film web 3 also results in the transfer nip 7. However, this is the case only for transfer film supply rolls 2 which have the same diameter. Rolls 2 having different diameters must then be driven at different speeds on different supply shafts 1.

Figure 2:
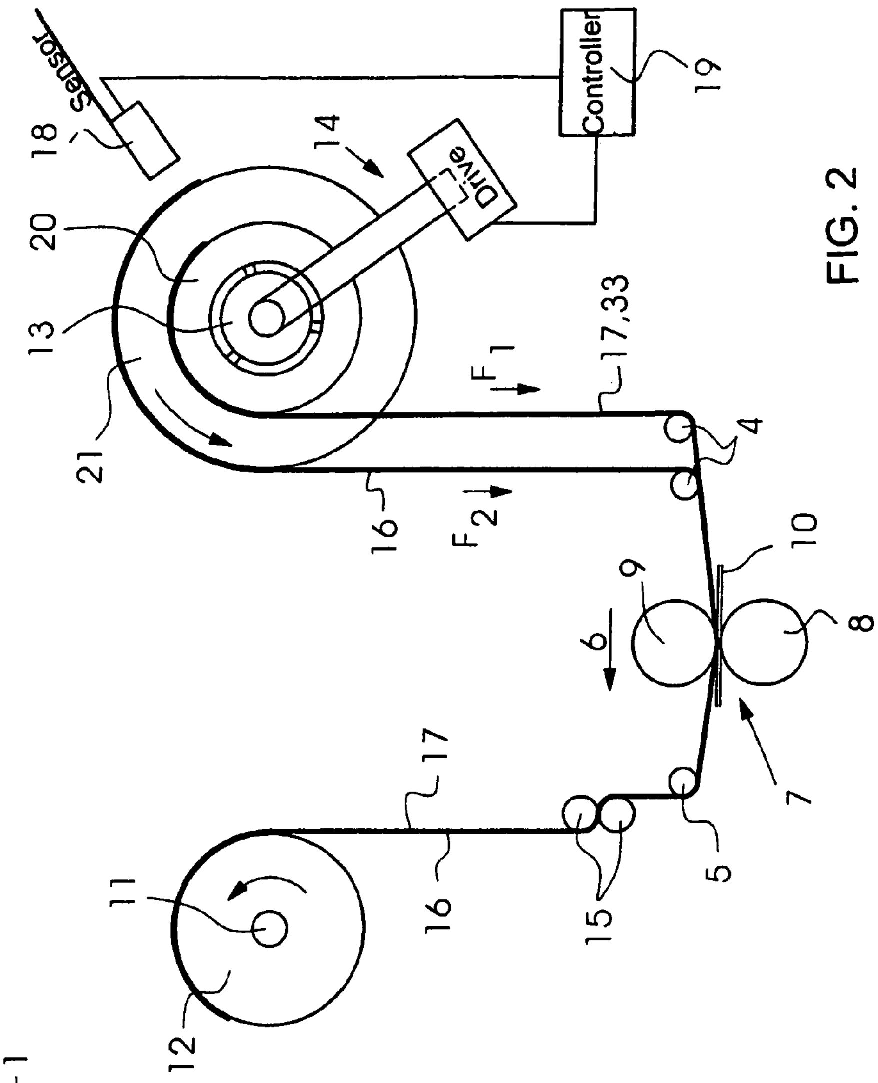
FIG. 2 is a diagrammatic, side view of a transfer apparatus having a friction shaft as a supply shaft according to the invention.

FIG. 2 shows an apparatus according to the invention for the transfer of the transfer layer to the printing material 10, which makes it possible to drive and to use a plurality of transfer film supply rolls 20, 21, 22 with different diameters on a common supply shaft.

In the case illustrated here, the supply shaft is constructed as a friction shaft 13. Further elements which are identical to elements from the previous drawing are designated by the same designations here.

The friction shaft 13 is illustrated symbolically in the case illustrated here such that, for example, by use of compressed air, individual pins can be forced out of the shaft 13 so that they produce frictional contact with the inside of a core of a transfer film supply roll 20, 21, 22. In alternative embodiments, a friction shaft can also be implemented in such a way that elements are forced through the cores into the interior of the shaft and here form frictional contact with an inner ring of the shaft. The cores can also be connected directly and firmly to an outer ring of the shaft and the frictional contact is produced between the outer ring and an inner ring of the shaft, so that indirect frictional contact between the rolls and the shaft is produced. Possible friction shafts that can be used are produced and marketed, for example, by the company AIR-MAT TECHNOLOGIE in Vendin-le-Vieil (Lens) in France, for example a winding shaft under the trademark "Modell FRB".

The transfer film supply rolls 20, 21, 22 are provided on the friction shaft 13. In this case, the rolls 20, 21, 22 contain cores, not further illustrated, with which they rest on the surface of the friction shaft 13. Via these cores, frictional contact is produced between the friction shaft 13 and the rolls 20, 21, 22. The magnitude of the friction can be set by a non-illustrated control system. For this purpose, for example, it is possible to exert a hydraulic pressure on the pins responsible for the friction in such a way that the latter are pressed more intensely or less intensely against the cores and thus increase or reduce the friction. These do not have to be pins directly in this case; it is also possible to use flat elements which produce a frictional contact appropriately in the same way.

The friction shaft 13 is driven via a drive 14, so that it rotates in the direction of the arrow illustrated. In addition, the drive 14 can also be responsible for varying the frictional force. The different diameters of the transfer film supply rolls 20, 21, 22 are detected via sensors 18 which determine the radius of the rolls 20, 21, 22 without contact. The diameters D of the rolls 20, 21, 22 that are determined are transmitted to a control system 19. The latter controls the drive 14 as a function of the diameters detected and of an average feed speed $V_{vm}$ of the transfer film part webs 16, 17, 33 which are unwound from the rolls 20, 21, 22. In the case illustrated here, the part webs 16, 17, 33 are transported through the transfer nip 7 constantly at a feed speed $V_B$ of the printing material 10. The average feed speed $V_{vm}$ therefore corresponds to the feed speed $V_B$ of the printing material 10. The control system 19 arranges for the drive 14 to drive the friction shaft 13 in such a way that the nominal circumferential speed $V_{UnV}$ of the roll 21 with the greatest diameter is less than the average feed speed $V_{vm}$ of the transfer film part webs. Should the part webs 16, 17, 33 have different average feed speeds $V_{vm}$, then the lowest of these speeds is selected as the master speed. To determine possible different speeds, non-illustrated speed sensors, can also be provided in the region of the individual part webs 16, 17, 33. The nominal circumferential speed $V_{UnV}$ in this case designates the circumferential speed which the largest roll 21 would have if there were a rigid connection between friction shaft 13 and transfer film supply roll 21.

The deviation of the nominal circumferential speed $V_{UnV}$ from the feed speed Vm can in this case be predefined permanently in the control system 19 or transmitted to the control system 19 from outside via a user interface, not illustrated. In this case, a preferred deviation is −5%.

The feed speed $V_B$ of the printing material can likewise be determined by a non-illustrated sensor, or transmitted directly to the control system 19 via a transport control system for the printing material 10, not illustrated either. If all the transfer film part webs 16, 17, 33 have the feed speed $V_B$ of the printing material 10 as the average feed speed $V_{UmV}$, then this speed is sufficient for controlling the drive 14.

The transfer film part webs 16, 17, 33 are fed to the transfer nip 7 over deflection rolls 4 and then to the collecting shaft 11 over deflection rolls 5.

Provision can be made for all the part webs 16, 17, 33 to be wound up on a common collecting roll 12. Likewise, however, there can also be different part rolls.

Between the collecting shaft 11 and the transfer nip 7, a pair of forward pulling rolls 15 is provided. The part film webs 16, 17, 33 are wound around the forward pulling rolls 15 in such a way that a transfer of force to the part film webs 16, 17, 33 is possible via the forward pulling rolls 15. If all the part film webs 16, 17, 33 move at the same speed, then one pair of rolls 15 is sufficient. In the case of different speeds, individual pairs of rolls 15 must be provided for all the part film webs 16, 17, 33 which have different speeds.

The forward pulling rolls 15 exert tensile forces F1, F2 on the part film webs 16, 17, 33. The forward pulling rolls 15 are driven via a control system and drives, not illustrated, in such a way that they pull the part film webs 16, 17, 33 through the transfer nip 7 in each case at the feed speed $V_B$. In this way, a certain tension of the part film webs 16, 17, 33 is always achieved, even when there is no contact between the webs 16, 17, 33 and the impression cylinder 8 or transfer cylinder 9, which is the case for example during the passage of cylinder channels. By the tensile forces F1, F2, in each case, at least for some time, the frictional forces between the transfer film supply rolls 20, 21, 22 and the friction shaft 13 are overcome, so that slippage occurs. Depending on the diameter of the rolls 20, 21, 22, a different pull is produced, so that ultimately all the rolls have the same actual circumferential speed which, in the case outlined, corresponds to the feed speed $V_B$ of the printing material. In this way, the transfer film supply rolls 20, 21, 22 even with different diameters D can be provided on the friction shaft 13 in such a way that they all have the necessary circumferential speed for a clean film transfer within the transfer nip 7.

Figure 3:
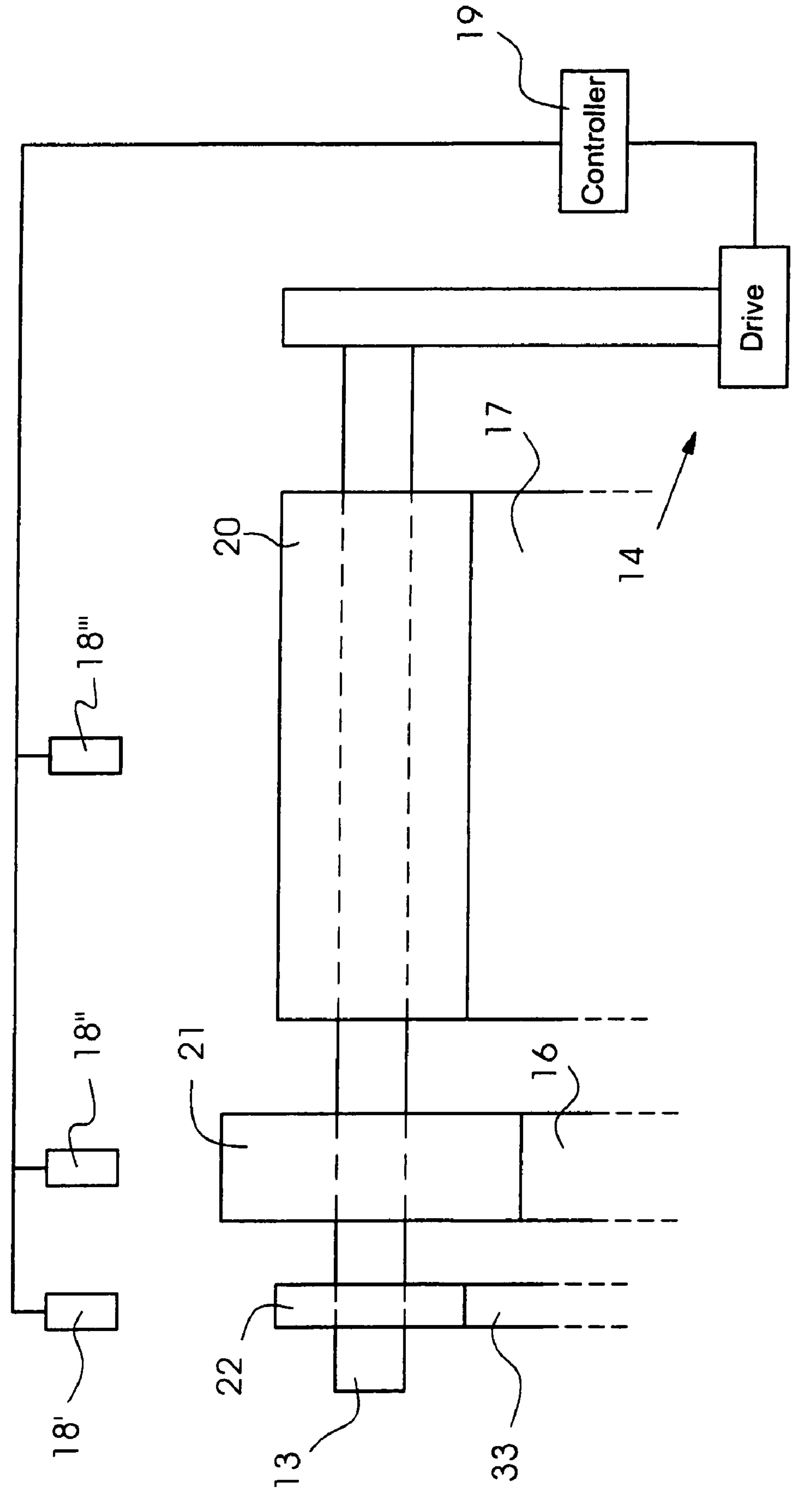
FIG. 3 is a diagrammatic, plan view of the transfer apparatus according to FIG. 2 schematically from above.

FIG. 3 shows a plan view of the arrangement for film transfer according to FIG. 2. Here, only the elements in the region of the friction shaft 13 are illustrated. Each transfer film supply roll 20, 21, 22 is in this case assigned an individual sensor 18', 18" and 18'", which determine the respective diameters of the rolls 20, 21, 22. Identical designations identify identical elements. Otherwise, the film transfer is carried out as described for FIG. 2.

Figure 4:
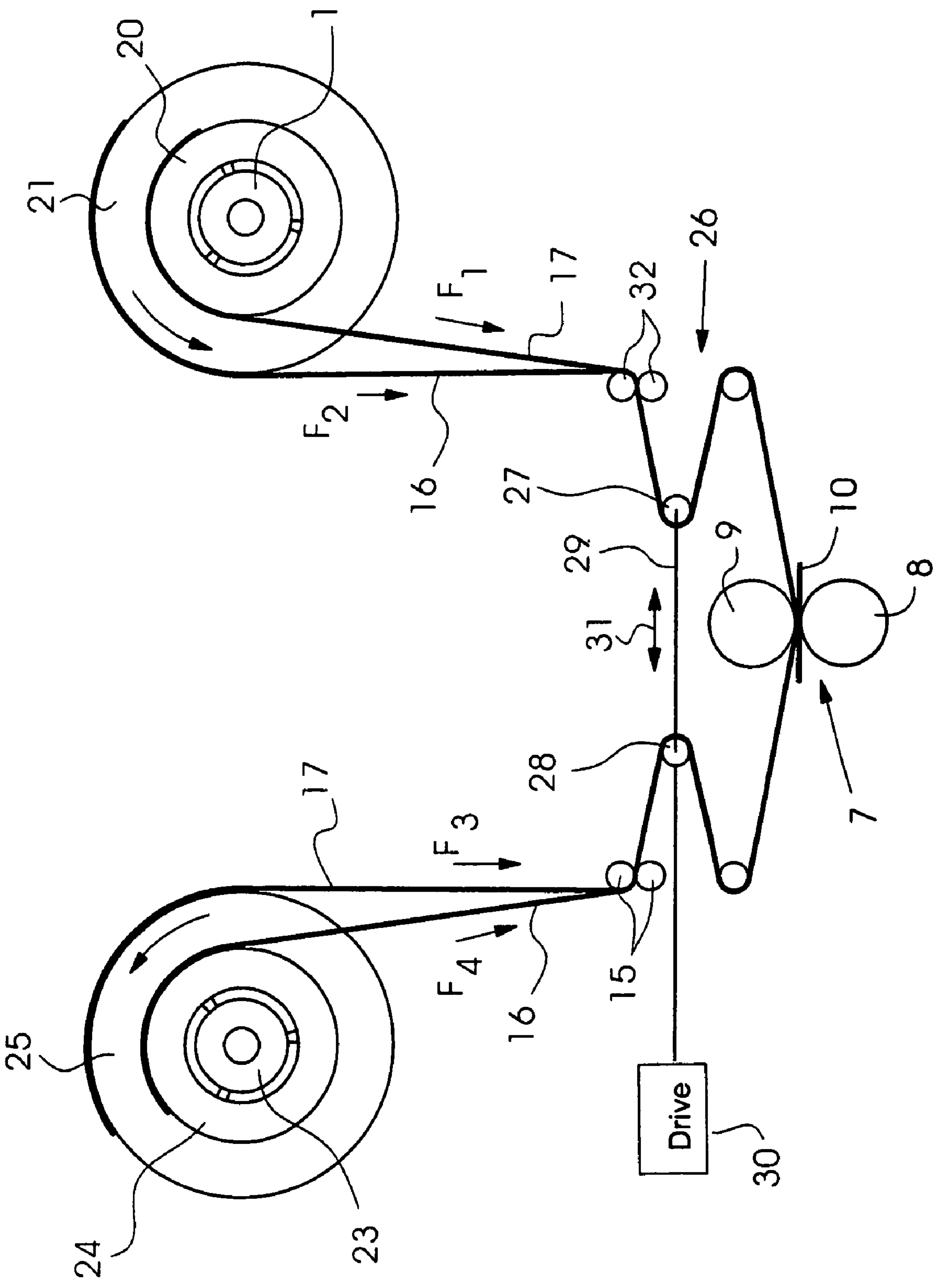
FIG. 4 is a diagrammatic, side view of the transfer apparatus having two friction shafts and a film cycling device.

In FIG. 4, an alternative embodiment for the film transfer of part film webs 16, 17 from transfer film supply rolls 20, 21 with different diameters D is illustrated. Identical elements are also identified here by identical designations.

As described in relation to FIG. 2, tensile forces F1, F2 are exerted on the part film webs 16, 17 from the friction shaft 13 in the direction of the transfer nip 7 via the forward pulling rolls 15.

In addition, the collecting shaft is also constructed as a friction shaft 23 here. On the friction shaft 23, transfer film collecting rolls 24, 25 with different diameters D' are provided, which hold transfer film part webs 16, 17. In order to effect tensile forces F3 and F4 on the transfer film part webs 16, 17 from the friction shaft 23 in the direction of the transfer nip 7, a pair of forward pulling rolls 32 is provided on the opposite side of the transfer nip and, in a manner analogous to the pair of rolls 15 already described, ensure the maintenance of a certain web tension and the desired feed speeds of the transfer part film webs 16, 17 in the transfer nip 7. Should only the friction shaft 23 be driven, then, in a manner analogous to the structure in FIG. 2, only the pair of forward pulling shafts 32 need be provided. Likewise, the friction shaft 23 is also driven in such a way that the nominal circumferential speed of the roll 24, 25 with the smallest diameter runs approximately +5% more quickly than the average feed speed Vm of the film through the transfer nip 7.

In the exemplary embodiment illustrated here, a film cycling device 26 is additionally provided. It contains two guide rollers 27, 28 around which the film webs 16, 17 are wrapped. The guide rollers 27, 28 are coupled to each other via a coupling 29. The coupling 29 can be, for example, a pair of rods which act axially on the end faces of the guide rollers 27, 28 and in this way connect them to each other. Via a drive 30, the guide rollers 27, 28 can be activated and driven in such a way that they are displaced in the direction of the double arrow 31, either toward the collecting shaft or toward the supply shaft. In this way, film cycling can be implemented, the average feed speed $V_{vm}$ of the film webs 16, 17 being reduced somewhat. In a central position of the guide rollers 27, 28, the film webs 16, 17 have the same speed $V_B$ as the printing material 10. If the guide rollers 27, 28 are moved in the direction of the collecting shaft, then the speed of the transfer film part webs 16, 17 in the transfer nip 7 is reduced; this is expedient if no transfer layer is being transferred and the transfer cylinder 9 is not set against the impression cylinder 8. This is the case, for example, in the event of a passage by a cylinder channel. Then, if the printing material 10 comes into the transfer nip 7 again, the guide rollers 27, 28 are deflected out in the direction of the supply shaft and, in this way, accelerate the part film webs 16, 17 until they again have the speed $V_B$ of the printing material in the transfer nip 7.

In this way, transfer film can be saved in regions in which no film transfer to the printing material 10 is carried out.

A still greater saving in transfer film is possible as a result of the provision of film stores; these can be provided in the form of vacuum stores for holding film on both sides of the transfer nip 7. Such a film store is disclosed in the European patent application EP 0 578 706 A1, to which reference is made completely hereby and whose content in relation to the embodiment of a film store in the form of a buffer for holding transfer film is incorporated herein in its entirety.

I claim:

1. An apparatus for transferring a transfer layer from a carrier film, which together form a transfer film, to a printing material, the apparatus comprising:

at least one film module having at least one transfer film supply roll for storing and unwinding at least one transfer film web and a supply shaft for holding said at least one transfer film supply roll;

a drive for driving said supply shaft;

a transfer film guiding device for guiding the transfer film web from said supply shaft to a transfer nip along a film transport path, the transfer nip being formed by an impression cylinder and a film transfer cylinder for transferring the transfer layer to the printing material, by guiding the printing material through the transfer nip along a printing material transport path; and a collecting device for accommodating the at least one transfer film web guided through the transfer nip, said collecting device having at least one transfer film collecting roll for winding up the at least one transfer film web and a collecting shaft for holding said at least one transfer film collecting roll, at least said supply shaft being a friction shaft, said friction shaft being driven by said drive so that a transfer of a rotational movement of said friction shaft to said at least one transfer film supply roll is carried out via a frictional connection between said friction shaft and said transfer film supply roll which can be overcome by tensile forces of the transfer film web.

2. The apparatus according to claim 1, further comprising at least one forward pulling device for pulling the at least one transfer film web in a direction of the transfer nip and disposed downstream of said supply shaft.

3. The apparatus according to claim 2, wherein said forward pulling device is a pair of forward pulling rolls exerting a tensile force on the at least one transfer film web via friction, so that a pull in the direction of the transfer nip is exerted on at least one of said at least one transfer film supply roll and said at least one transfer film collecting roll.

4. The apparatus according to claim 2, wherein said forward pulling device is disposed after the transfer nip and exerts a tensile force in the direction of the transfer nip on said at least one transfer film supply roll on said supply shaft.

5. The apparatus according to claim 2, wherein said forward pulling device is disposed before the transfer nip and exerts a tensile force in the direction of the transfer nip on said at least one transfer film collecting roll on said collecting shaft.

6. The apparatus according to claim 2, wherein said forward pulling device includes the impression cylinder and the film transfer cylinder forming the transfer nip.

7. The apparatus according to claim 1, wherein said at least one transfer film supply roll is at least two transfer film supply rolls, which in each case are able to store and unwind the transfer film web, and are disposed on said supply shaft.

8. The apparatus according to claim 7, further comprising at least one determining device for determining a roll diameter of said at least two transfer film supply rolls.

9. The apparatus according to claim 8, wherein said determining device has non-contacting sensors with one of said non-contacting sensors assigned to each of said transfer film supply rolls, said non-contacting sensors detecting a distance of a surface of said transfer film supply roll from said non-contacting sensor or directly to detect a radius of said transfer film supply roll.

10. The apparatus according to claim 9, wherein said non-contacting sensors are selected from the group consisting of ultrasonic sensors and optical sensors which detect light reflected from the surface.

11. The apparatus according to claim 8, wherein said determining device has contacting sensors with one of said contacting sensors assigned to each of said transfer film supply rolls.

12. The apparatus according to claim 11, wherein said contacting sensors are each a running wheel for determining a change in a diameter of said transfer film supply roll from a measured unwind travel.

13. The apparatus according to claim 11, wherein said contacting sensors are resistance sensors for determining a quantity of the transfer film web present on said transfer film supply roll via a measured resistance.

14. The apparatus according to claim 1, further comprising a film cycling device disposed in a region of the transfer nip.

15. The apparatus according to claim 14, wherein said film cycling device contains a drive device and at least two guide rollers coupled to each other for guiding the transfer film web, said at least two guide rollers are disposed on opposite sides of the transfer nip, said at least two guide rollers can be moved simultaneously in a first direction via said drive device, so that a speed of the transfer film web through the transfer nip is reduced, and can be moved simultaneously in a second direction, so that the speed of the transfer film web in the transfer nip corresponds to a transport speed of the printing material.

16. The apparatus according to claim 1, further comprising at least one transfer film buffer disposed in a region between said supply shaft and the transfer nip.

17. The apparatus according to claim 1, further comprising at least one transfer film buffer disposed in a region between the transfer nip and said collecting device.

18. An apparatus for transferring a transfer layer from a carrier film, which together form a transfer film, to a printing material, the apparatus comprising:

- at least one film module having at least one transfer film supply roll for storing and unwinding at least one transfer film web, a supply shaft for holding said at least one transfer film supply roll, and a drive for driving said supply shaft, said supply shaft being a friction shaft driven by said drive for transferring a rotational movement of said friction shaft to said at least one transfer film supply roll being carried out via a frictional connection between said friction shaft and said at least one transfer film supply roll, which can be overcome by tensile forces of the transfer film web;
- a transfer film guiding device for guiding the transfer film web from said supply shaft to a transfer nip along a film transport path, the transfer nip being formed by an impression cylinder and a film transfer cylinder for transferring the transfer layer to the printing material, by guiding the printing material through the transfer nip along a printing material transport path; and
- a collecting device for holding and/or destroying the at least one transfer film web guided through the transfer nip.

19. The apparatus according to claim 18, wherein said collecting device has at least one container and feed elements for feeding the transfer film web to said container.

20. The apparatus according to claim 18, wherein said collecting device contains at least one shredder for destroying the transfer film web by shredding.

21. A method for transferring a transfer layer from a carrier film, which together form a transfer film, to a printing material, which comprises the steps of:

- providing the apparatus according to claim 1;
- guiding the at least one transfer film web along the film transport path to the transfer nip;
- transferring the transfer layer from the transfer film web to the printing material within the transfer nip;
- guiding the transfer film web to the collecting device.

22. The method according to claim 21, which further comprises:

- providing the at least one transfer film supply roll as one of a plurality of transfer film supply rolls disposed on the supply shaft;
- determining diameters D of each of the transfer film supply rolls on the supply shaft;
- determining an average feed speed $V_{vm}$ of the transfer film web through the transfer nip; and
- driving the supply shaft with an angular velocity w such that a nominal circumferential speed $V_{UnV}$=w*D/2 of the transfer film supply roll with a greatest diameter is lower than the average feed speed $V_{vm}$ of the transfer film web through the transfer nip.

23. The method according to claim 22, which further comprises driving the supply shaft such that the nominal circumferential speed $V_{UnV}$ is less than 100% but equal to or more than 95% of the average feed speed $V_{vm}$.

24. The method according to claim 21, which further comprises:

- providing the at least one transfer film collecting roll as one of a plurality of transfer film collecting rolls disposed on the collecting shaft;
- determining diameters D of each of the transfer film collecting rolls on the collecting shaft;
- determining an average feed speed $V_{vm}$ of the transfer film web through the transfer nip; and
- driving the collecting shaft with an angular velocity w such that a nominal circumferential speed $V_{UnS}$=w*D/2 of the transfer film collecting roll with a smallest diameter is higher than the average feed speed $V_{vm}$ of the transfer film through the transfer nip.

25. The method according to claim 24, which further comprises driving the collecting shaft such that the nominal circumferential speed $V_{UnS}$ is more than 100% but less than or equal to 105% of the average feed speed $V_{vm}$.

26. The method according to claim 21, which further comprises pulling the transfer film web off at least one of the supply shaft and the collecting shaft such that an actual feed speed $V_v$ of the transfer film web in a region of the transfer nip corresponds at least for some time to a printing material speed $V_B$.

27. The method according to claim 26, which further comprises cycling the transfer film web such that the actual feed speed $V_v$ at times in which no film transfer to the printing material is carried out deviates from the printing material speed $V_B$ and, before an envisaged film transfer, is accelerated in such a way that the actual feed speed again corresponds to the printing material speed $V_B$.

* * * * *